US006456701B1

(12) United States Patent
O'Brien et al.

(10) Patent No.: US 6,456,701 B1
(45) Date of Patent: Sep. 24, 2002

(54) NETWORK-CENTRIC CONTROL OF ACCESS TO TRANSCEIVERS

(75) Inventors: William G. O'Brien, Orleans; L. Lloyd Williams, Kanata, both of (CA)

(73) Assignee: Bell Canada, Montreal (CA)

( * ) Notice: Subject to any disclaimer, the term of this patent is extended or adjusted under 35 U.S.C. 154(b) by 105 days.

(21) Appl. No.: 09/595,920

(22) Filed: Jun. 16, 2000

(51) Int. Cl.[7] .............................................. H04M 11/00
(52) U.S. Cl. .............................. 379/93.02; 379/142.01; 379/142.05; 379/196
(58) Field of Search ........................... 379/93.02, 93.03, 379/91.01, 91.02, 127.01, 142.01, 142.04, 142.05, 196, 197, 198

(56) References Cited

U.S. PATENT DOCUMENTS

| | | | |
|---|---|---|---|
| 4,876,717 A | | 10/1989 | Barron et al. |
| 4,922,521 A | | 5/1990 | Krikke et al. |
| 5,181,238 A | | 1/1993 | Medamana et al. |
| 5,276,444 A | | 1/1994 | McNair |
| 5,590,184 A | * | 12/1996 | London ....................... 379/142 |
| 5,680,446 A | * | 10/1997 | Fleischer, III et al. ...... 379/114 |
| 5,732,137 A | * | 3/1998 | Aziz ............................ 380/25 |
| 5,901,284 A | * | 5/1999 | Hamady-Swink ........... 395/186 |
| 6,182,076 B1 | * | 1/2001 | Yu et al. ....................... 707/10 |
| 6,226,289 B1 | * | 5/2001 | Williams et al. ............. 370/385 |
| 6,343,120 B1 | * | 1/2002 | Rhodes ........................ 379/142 |

* cited by examiner

*Primary Examiner*—Melur Ramakrishnaiah
(74) *Attorney, Agent, or Firm*—Van Dyke, Gardner, Linn & Burkhart, LLP

(57) ABSTRACT

An apparatus and methods enforcing network-centric control over access to a selected destination point in a switched telephone network are presented in which, a user seeking access to the selected destination point is authenticated in the network on a separate telephone connection prior to authorizing the user to access the selected destination point. An on-the-fly generated authorized calling line identification is associated with an origination point from which the user initiates the call completion request to enforce access control. The call completion is monitored end-to-end and the resulting telephone session is audited at the signaling and payload levels providing management support personnel with information substantiating the release of the call in case of misuse or intrusion.

56 Claims, 12 Drawing Sheets

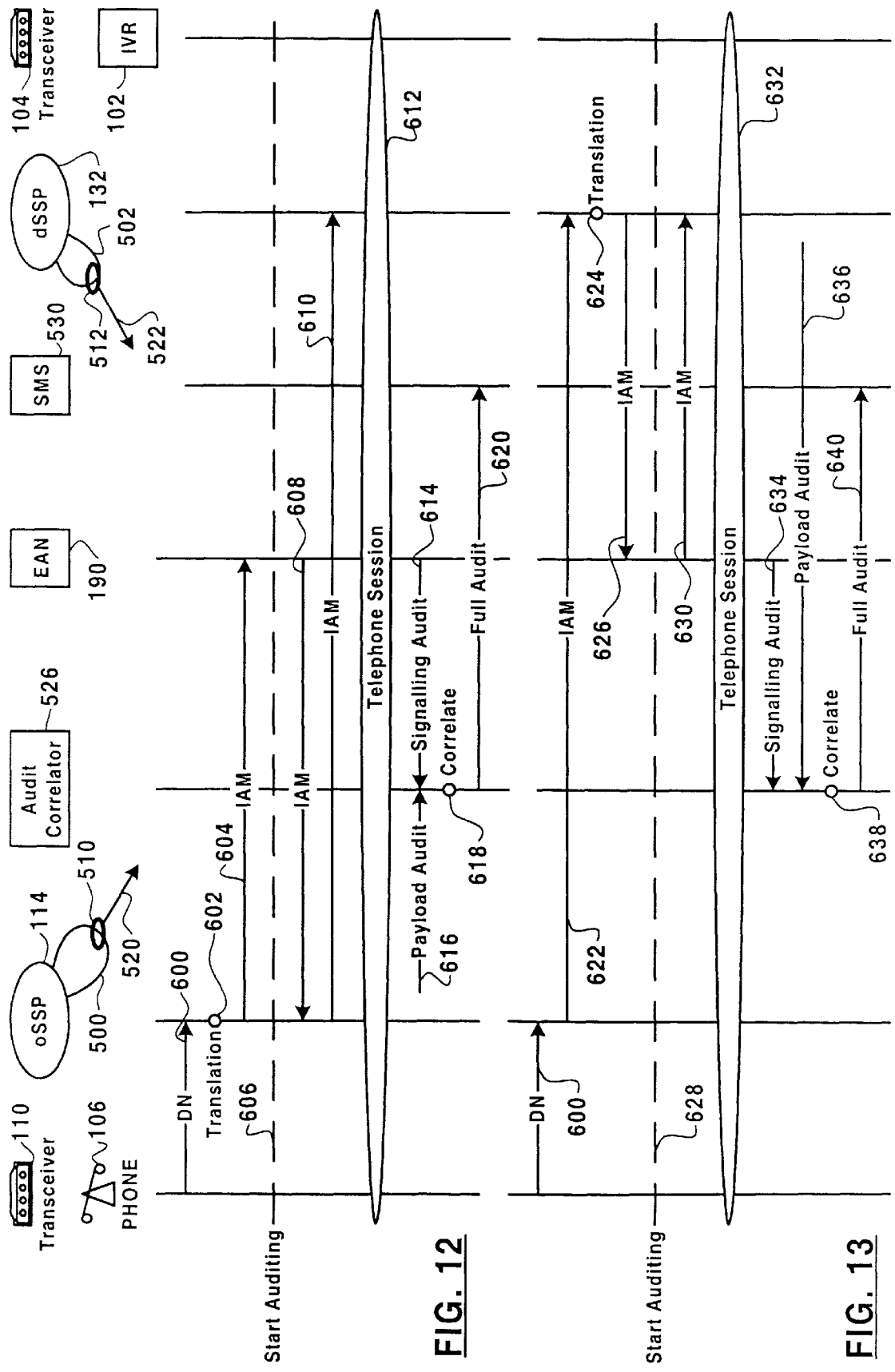

NETWORK-CENTRIC CONTROL OF ACCESS TO TRANSCEIVERS

TECHNICAL FIELD

This invention relates to enforcement of central control over access in a switched telephone network and, in particular, to methods and apparatus for providing authorized and, optionally, audited access to a selected destination point in a switched telephone network.

BACKGROUND OF THE INVENTION

Telecommunications networks such as the Public Switched Telephone Network (PSTN), Local Area Networks (LANs), Wide Area Networks (WAN), etc. are made up primarily of network elements that are geographically distributed. Maintenance and servicing of these network elements is commonly performed employing unattended "Back Door Modems" (BDMs) accessed by dial-up connections through the PSTN. The BDMs operate in accordance with well understood standards. An important issue related to the provision of telephone connections over the PSTN, and the provision of data transport services over data networks such as LANs and WANs, is that of providing authorized access to the equipment which supports these services. The equipment and services that can be controlled once access is gained through a BDM, are subject to attack by unauthorized persons who accidentally or covertly obtain an access number. Consequently, it is important to ensure that only authorized access to BDMs is permitted.

The issue of authorized access is also of interest in the provision of telephone based services such as telephone banking, telephone voting, etc. The goal in providing access to these services is to discriminate customers/users from impostors.

Authorized access to equipment can also be used to inhibit the misuse of the equipment and associated resources, such as for example, the use of company equipment for personal use or gain.

It is estimated that in up to 80% of telecommunications fraud cases, an employee of the telecommunications company providing the telecommunications service is involved. A high incidence of fraud is enabled because BDMs have no capacity to discriminate between authorized and unauthorized users seeking access to equipment. It is also estimated that upwards of 60% of corporate communications are spent in non-work related activity, and upwards of 40% of corporate communications budgets are spent in casual usage of telecommunications equipment and services.

A distinction is made in the presentation of this application between an authenticated user to access selected destination points and an authorized user to access a selected destination point: An authenticated user to access a selected destination point is a user who has been preregistered with an authentication agency granting access to selected destination points for requesting access to selected destination points and in particular a user who has overcome a predetermined subgroup of predetermined authentication challenges. An authorized user to access a selected destination point is an authenticated user to access a selected destination point designated to access a selected destination point. In what follows the "authenticated" and the "authorized" terms will be used when referring to the distinction presented above.

It is known in the art to provide apparatus and methods for secure access to BDMS. User/service profile matching is provided for users of telephone based services accessed through Interactive Voice Response (IVR) units as described in United States Patent No. 5,276,444 which issued to McNair on January 4, 1994. McNair focuses on providing multiple levels of authentication to limit loss and liability in providing the services. An authentication system removes itself from the session once the session is established.

United States Patent No. 5,181,238 which issued to Medamana et al. on January 19, 1993, also describes a user/service profile matching method for authenticating users. This method focuses on providing a single authentication method for users subscribing to multiple telephone services available on a telephone network.

A call transfer and call-back upon authentication method is described in United States Patent No. 4,876,717 which issued to Barron et al. on October 24, 1989. This function is provided by an adjunct processor which disconnects itself from the call path once the connection is established.

A personal identification number-based authentication prior to establishing a connection using a call-back procedure is described in United States Patent No. 4,922,521 to Krikke et al. which issued on May 1, 1990. This method enforces access from specific origination points associated with pin numbers but does not describe how to discriminate between authorized and unauthorized access to a destination point.

All of these inventions have merit in providing different levels of protection. However, these solutions do not provide end-to-end call completion monitoring after authentication. Furthermore, none of these inventions provides real-time monitoring of telephone connections.

Considering that telephone switches, network routers, network bridges, network gateways, data switches, backup power equipment, Tele-banking IVR units, key systems and company PBX systems are generally accessible through transceivers, there is a need to provide authorized access control to this equipment which cannot be readily compromised.

OBJECTS OF THE INVENTION

It is an object of the invention to provide a method of authenticating users seeking access to equipment or service accessed through a dial-up transceiver in a switched telephone network.

It is another object of the invention to provide a method of authorizing users seeking access to a selected destination point accessed through a dial-up connection in a switched telephone network.

It is further object of the invention to provide a centralized real-time authorization of users seeking access to command controllable equipment accessed through a dial-up connection in a switched telephone network.

It is a further object of the invention to centrally authenticate and authorize users on the switched telephone network before establishing a telephone connection to a selected destination point.

It is a further object of the invention to authenticate a user seeking access to a selected destination point accessed through the PSTN, using a first communications connection before a connection is established between the user and the selected destination point.

It is a further object of the invention to monitor the authentication process and the call completion process to ensure that an authorized session progresses in accordance with an established protocol between an origination point and a selected destination point in the switched telephone network.

It is a further object of the invention to provide a full audit of both the signaling and the payload paths of a communications connection between an origination point and a selected destination point in a switched telephone network.

It is a further object of the invention to provide a facility for releasing, from a control point the switched telephone network, a telephone connection representing a communications connection between an originating point and a selected destination point.

It is a further object of the invention to provide control over access to a plurality of selected destination points in the switched telephone network accessed using a common directory number.

SUMMARY OF THE INVENTION

The invention provides a method of enforcing network-centric control over access to a selected destination point in a switched telephone network. Processing of call completion requests to establish a communications session to the selected destination point is made dependent on a calling line identification present in the call completion request.

The method comprises a first step of receiving a call completion request from an originating point. The call completion request bears an origination calling line identification. The user associated with the origination point is authenticated on receipt of the call completion request. In a further step of the method, an authorized calling line identification is generated and is associated with the origination point for the purpose of completing a call to the selected destination point. A destination service switching point associated with the selected destination point is enabled to complete calls to the selected destination point based on the authorized calling line identification. A communication session is established between the origination point and the selected destination point based on the authorized calling line identification by substituting the origination calling line identification with the authorized calling line identification. As a final step, the authorized calling line identification is preferably discarded subsequent to completing the communication session between the user and the selected destination point. During call setup, the signaling path and the payload path can be routed through network equipment adapted to extract signaling and payload information to provide a full audit of the communications session.

According to one aspect of the invention, the user is provided with a directory number associated with the selected destination point. Network equipment routing call completion requests is enabled to detect directory numbers associated with the selected destination points and route the call completion requests to a point on the network adapted to authenticate the user.

According to a further aspect of the invention, the user is only provided with a general directory number for accessing a selected destination point. Network routing equipment is therefore enabled to route all call completion requests associated with the general directory number to an authentication server for further processing.

According to a further aspect of the invention, the user is provided with a directory number associated with a selected destination point after authentication of the user.

According to a further aspect of the invention, the communications session between the origination point and the selected destination point is established from a control node in the network.

According to a further aspect of the invention, network switching equipment associated with the destination point is enabled to complete calls to the selected destination point only on receiving call completion requests bearing an authorized calling line identification.

According to a further aspect of the invention, associated with each selected destination point there is an authorized calling line identification list that is consulted on each call completion request by the switching equipment associated with the selected destination point.

According to a further aspect of the invention, the authorized calling line identification list associated with the selected destination point is updated with an authorized calling line identification only after the authentication of the user, to enable the user to complete a call to the selected destination point.

According to a further aspect of the invention, the communications session between the origination point and selected destination point is monitored to capture signaling and payload data associated with the communications session.

According to a further aspect of the invention, the authorized calling line identification is removed from the authorized calling line identification list on completing the communications session between the origination point and the selected destination point.

According to a further aspect of the invention, the communications session between the origination point and the selected destination point is established by routing the signaling path and the payload path through network equipment adapted to extract signaling and payload information.

According to a further aspect of the invention, the authorized calling line identification is generated in a pseudo random fashion subsequent to authentication of the user According to a further aspect of the invention, the calling line identification carried in signaling messages from an origination point, from which an authorized user initiates a call request, is modified by substituting the originating calling line identification with an authorized calling line identification.

According to yet another aspect of the invention, a full audit of a connection between an origination point and a selected destination point is provided in real time to a service management system to enable real time decision making and action taking in case of detection of intrusion or misuse.

BRIEF DESCRIPTION OF THE DRAWINGS

FIG. 12 is a call flow diagram showing steps for completing an audited telephone connection via an origination service switching point equipped with loop-back trunks and providing a full audit; and FIG. 13 is a call flow diagram showing steps for completing an audited telephone connection via a destination service switching point equipped with loop-back trunks and providing a full audit.

DETAILED DESCRIPTION OF THE PREFERRED EMBODIMENT

Figure 1:
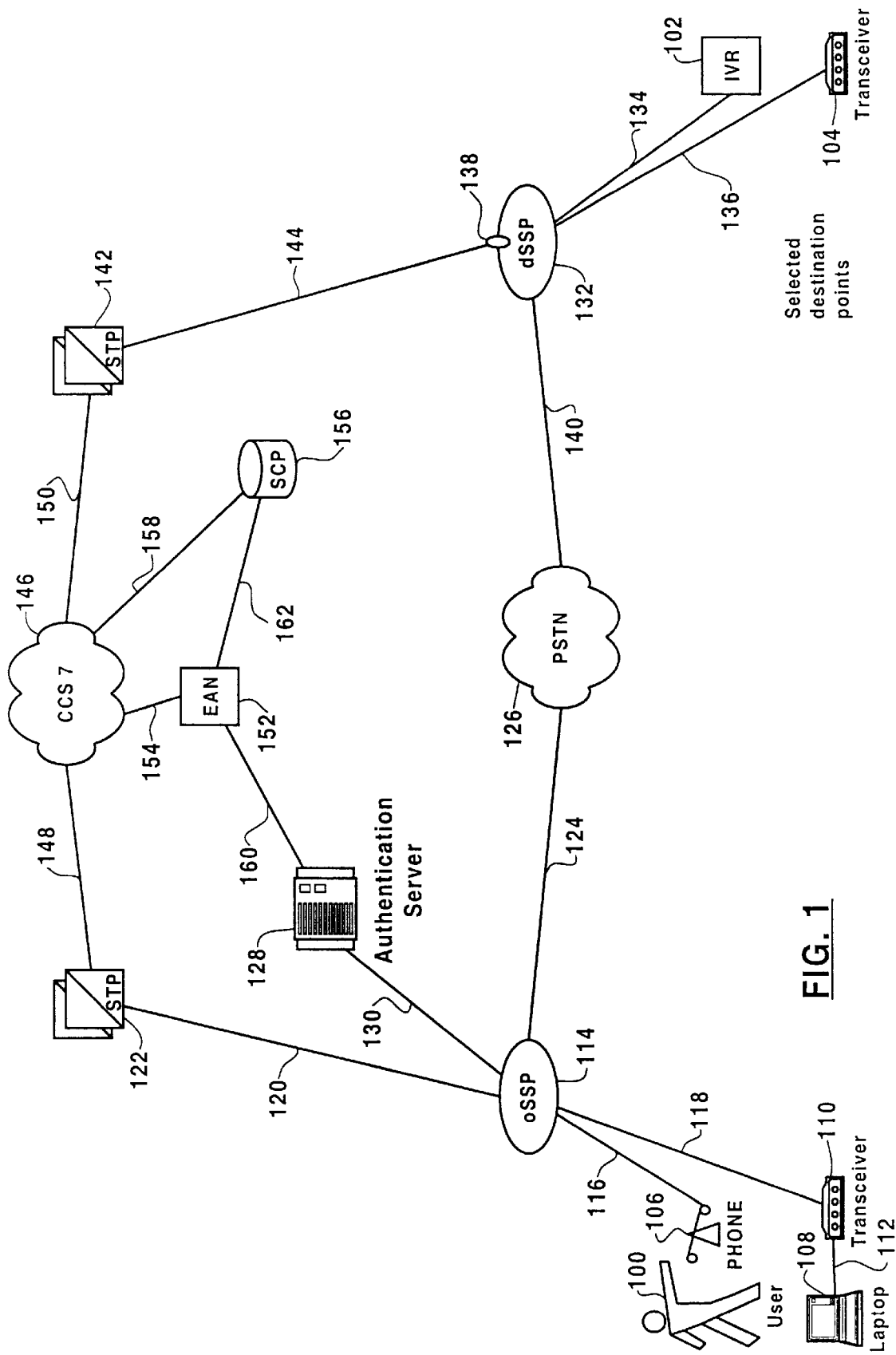
FIG. 1 is a schematic diagram showing interconnected network elements in a switched telephone network enabled to provide authorized access to selected destination points in accordance with one embodiment of the invention.

FIG. 1 is a schematic diagram showing interconnected network elements in a switched telephone network enabled to provide authorized access, in accordance with one embodiment of the invention, to selected destination points. A user 100 seeks access to a selected destination point in the telephone network such as an IVR unit 102 or a transceiver to 104. The user 100 may use a telephone set 106 to access the IVR 102 or the user 100 may use a terminal 108, connected to a transceiver 110 via a link 112 to access the transceiver 104. The telephone set 106 and the transceiver 110 are connected to an origination Service Switching Point (oSSP) 114 via local loops 116 and 118, respectively. The oSSP 114 is connected via signaling links 120 to a mated Signal Transfer Point (STP) pair 122 and via voice trunks 124 to the PSTN 126. An authentication server 128 is available in the switched telephone network and may be accessed via link 130. The selected destination points 102 and 104 are connected to a destination Service Switching Point (dSSP) 132 via local loops 134 and 136, respectively.

In order to provide special treatment in processing call completion requests to the selected destination points 102 and 104, the dSSP 132 is equipped with at least one inbound trigger 138. The inbound trigger 138 is enabled to trip in response to call completion requests to the selected destination points 102 an 104. The dSSP 132 is connected to the PSTN 126 via voice trunks 140 and, to a mated STP pair 142 via signaling links 144. The STPs 122 and 142 further connect to a Common Channel Signaling System Number 7 (CCS7) signaling network 146 via signaling links 148 and 150 respectively.

For purposes of enforcing control, signaling messages are routed in the signaling network 146 to an Enhanced Applications Network (EAN) 152, using methods known in the art via signaling links 154. The EAN 152 is a control point in the signaling plane of the switched telephone network and is assigned a point code enabling it to be configured in the network as any one or a combination of a Service Switching Point (SSP), Signal Transfer Point (STP) and a Service Control Point (SCP). The EAN 152 enforces network-centric control over authorized access to the selected destination points. Access control may be augmented by an SCP 156 which is accessed via a signaling link 158. The authentication server 128 is enabled to communicate with the EAN 152 using a link 160 which may be a dedicated link or a data network connection. The EAN 152 communicates with the SCP 156 via a link 162 which may also be a dedicated link or a data network connection.

Figure 2:
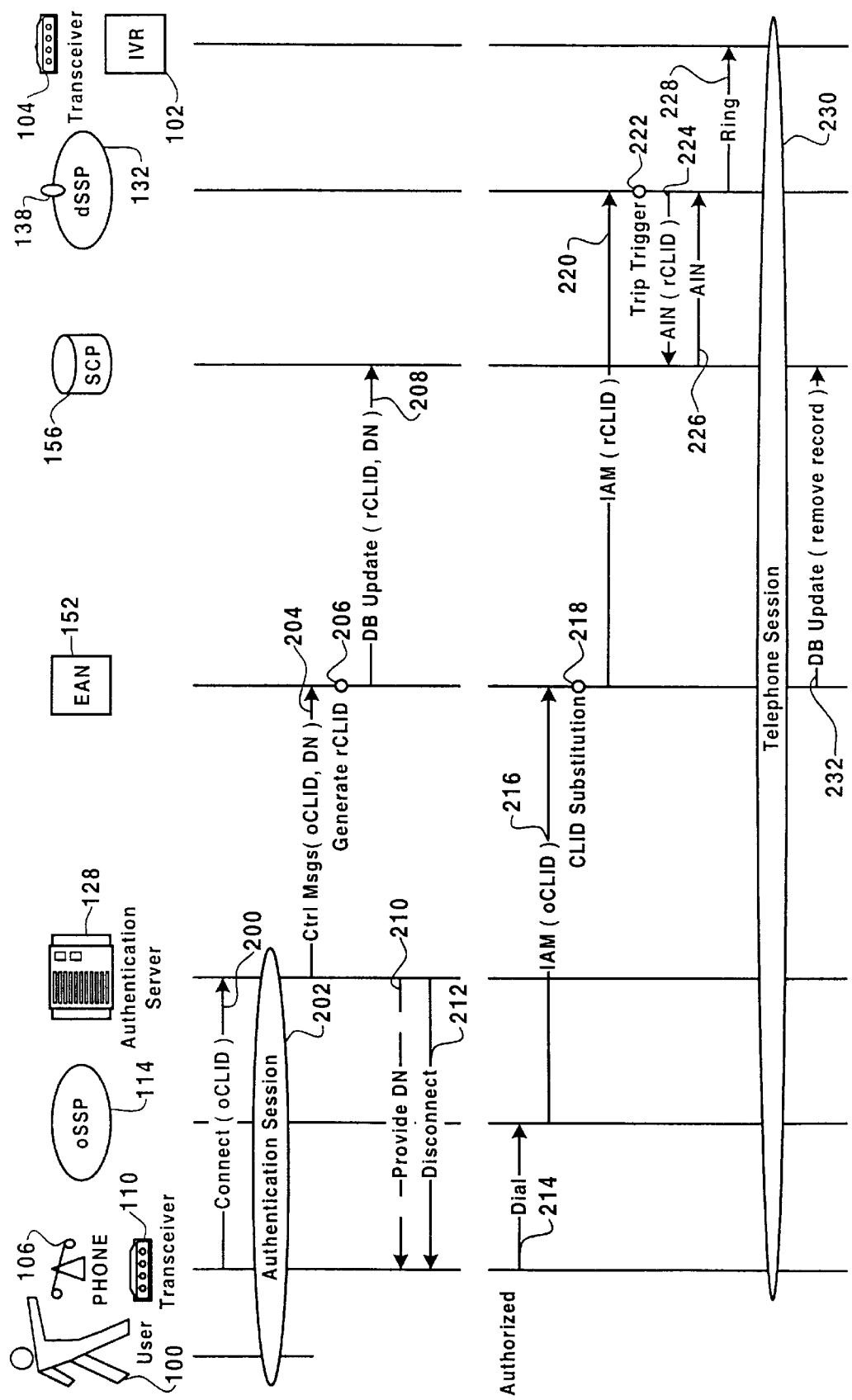
FIG. 2 is a call flow diagram in which an authorized telephone connection is completed using the network configuration shown in FIG. 1 for an authenticated user authorized to access a selected destination point in the switched telephone network.

FIG. 2 is a call flow diagram in which an authorized telephone connection is completed using the network configuration shown in FIG. 1 by a user 100 who is authorized to access a selected destination point in the switched telephone network. The user 100 establishes a first telephone connection to the authentication server 128 in step 200. Although shown schematically, the telephone connection is accomplished by dialing an access number which may generate Integrated Services Digital Network (ISDN) Private Rate Interface (PRI) signaling messages, or the like, between the oSSP 114 and the authentication server 128, in a manner well known in the art. As part of this first telephone connection establishing process, as will be presented below with reference to FIG. 9, an origination Calling Line Identification (oCLID) associated with the user's line occurrence is provided to the authentication server 128. The user 100 is authenticated during an authentication session 202 using methods known in the art.

Upon positive authentication of the user 100, the authentication server 128 receives an indication that the user 100 requires access to a selected destination point. If the authentication server 128 determines that the user 100 is authorized to access the selected destination point, the authentication server 128 sends control messages to the EAN 152 in step 204. The control messages contain the oCLID of the user and the directory number (DN) of the selected destination point. The EAN 152 generates a pseudo random CLID (rCLID) in step 206 and updates an access database maintained by the SCP 156 with the rCLID and the DN of the selected destination point, in step 208.

The access database can be implemented in many ways, as will be apparent to persons skilled in the art. For example, the SCP 156 may be programmed to maintain an authorized CLID list associated with each selected destination point.

The authentication server 128 may optionally provide the DN of the selected destination point to the user 100 in step 210. The authentication server 128 terminates the authentication session in step 212.

The user 100 subsequently initiates a call completion request to the selected destination point in step 214 by dialing the DN of the selected destination point. The EAN is a control point in the signaling network 146. Signaling messages 216 associated with the call are routed to and intercepted by the EAN 152. Routing the signaling messages to the EAN 152 can be enabled in the same manner as routing messages to an STP in which case the EAN is programmed to present itself to the signaling network as an STP.

The EAN 152 substitutes the oCLID in the IAM call completion request message with the rCLID, in step 218, and forwards them in step 220 to the dSSP 132. The inbound AIN trigger 138 detects the call completion request to the DN in step 222. The access database maintained by SCP 156 is queried in step 224 using a Transaction Capabilities Applications Part (TCAP) message. On receipt of the query message, the SCP 156 determines whether an rCLID/DN entry is present in the access database and, if so, returns a permission response in step 226. On receiving a permission response in step 226 from the SCP 156, the dSSP 132 alerts the selected destination point in step 228. Subsequent ISDN User Part (ISUP) signaling messages (not shown) complete the call setup in a manner well known in the art and a session 230 between the origination point and the destination point ensues.

After call setup, the EAN 152 instructs the SCP 156, in step 232, to remove the rCLID entry from the authorized CLID list associated with the selected destination point, thus preventing further calls completing to the selected destination point unless another authorization is performed.

As an alternative to using the access database and inbound triggers, the selected destination point can be enabled to only answer calls from a unique CLID known only to the EAN 152. In such an implementation, the EAN 152 substitutes a unique CLID for the oCLID in signaling messages sent to the dSSP 132.

Figure 3:
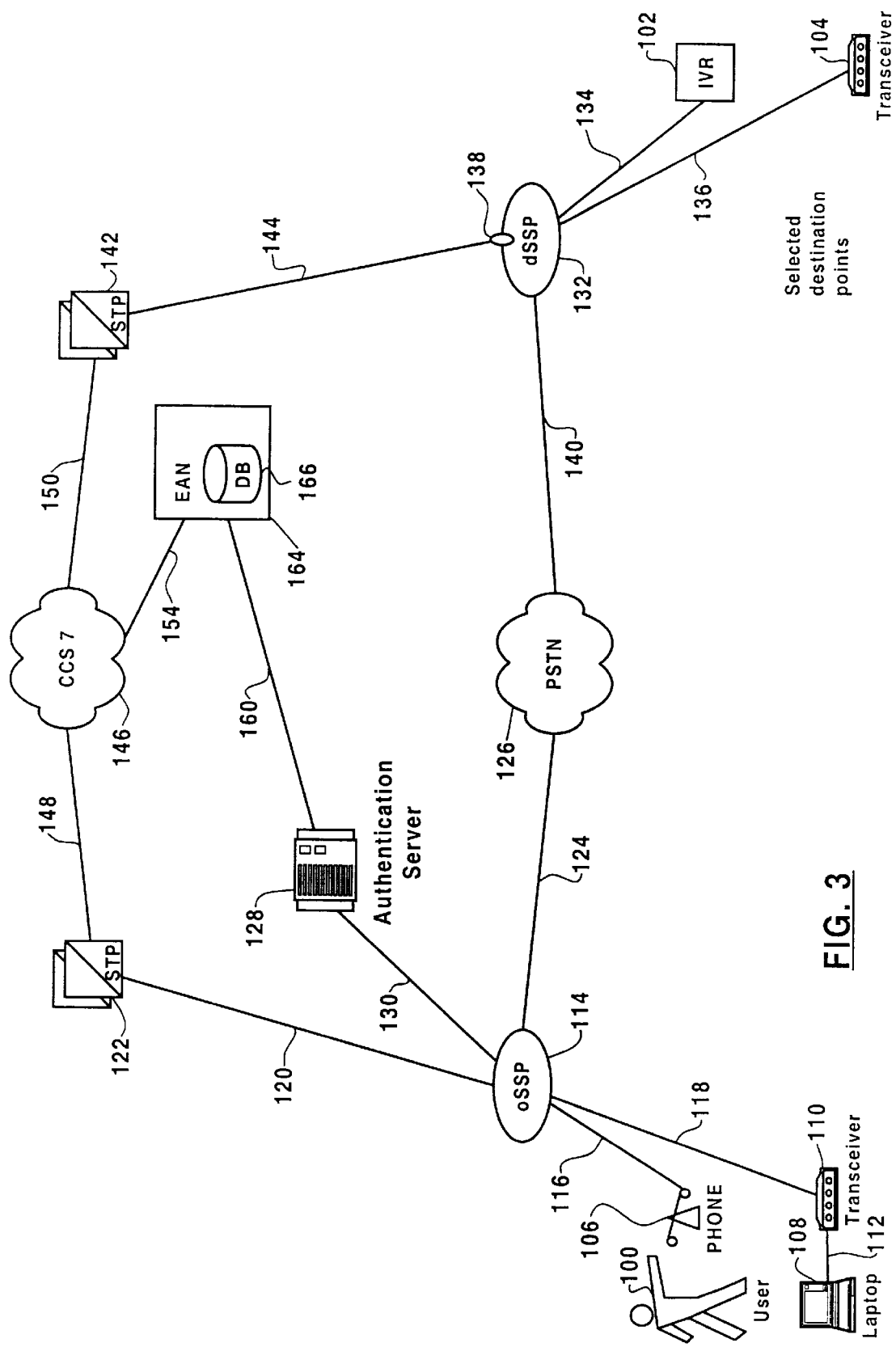
FIG. 3 is a schematic diagram showing another configuration of interconnected network elements in a switched telephone network enabled to provide authorized access to selected destination points.

FIG. 3 is a schematic diagram showing another configuration of interconnected network elements in a switched telephone network enabled to provide, in accordance with another embodiment of the invention, authorized access to selected destination points. The notable features of this implementation are that the EAN 164 maintains an access database 166 of authorized CLIDs. EAN 164 is programmed to present itself to the signaling network as an STP and an SCP processing both ISUP CCS7 signaling messages and TCAP CCS7 signaling messages. This implementation employs only a link 160 between the authentication server 128 and the EAN 164. The EAN 164 receives common channel signaling messages over signaling link 154.

Figure 4:
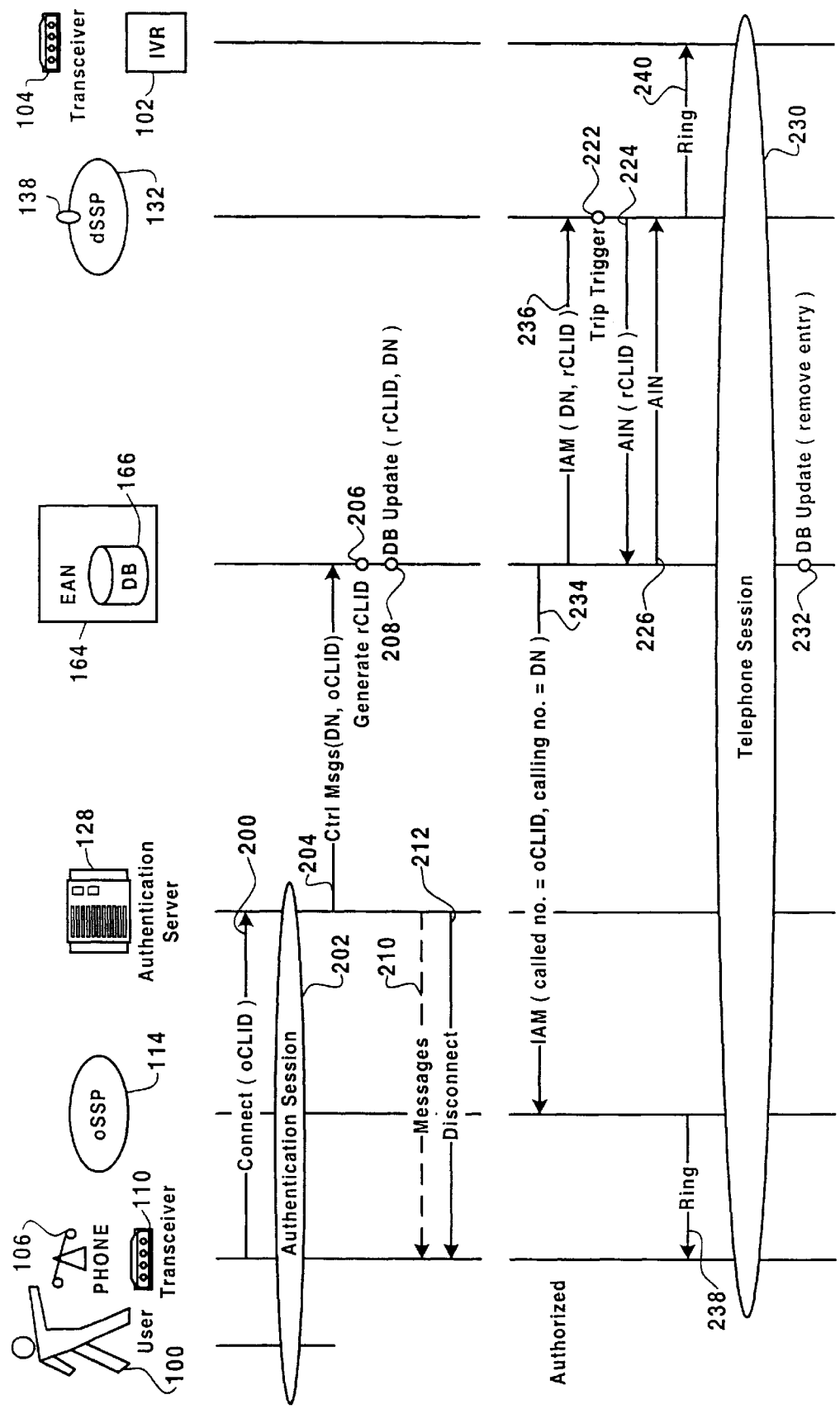
FIG. 4 is a call flow diagram in which an authorized telephone connection is completed from the center of the switched telephone network for an authenticated user authorized to access a selected destination point using the switched telephone network configuration shown in FIG. 3.

FIG. 4 is a call flow diagram schematically illustrating the setup of an authorized telephone connection completed using the network configuration shown in FIG. 3 from the EAN 164 for an authorized user 100 seeking access to a selected destination point. This method can be also implemented using the network configuration shown in FIG. 1.

All the steps shown in FIG. 4 are similar to the steps shown in FIG. 2 with the exception that post authorization of the user 100, the EAN 164, acting as a control point in the signaling network 146, places two call completion requests by sending two Initial Address Messages (IAM messages) 234 and 236. A first IAM having as the called number the oCLID associated with user's 100 line occurrence is sent to the oSSP 114. The second IAM having as the called number the DN of the destination point is sent to the dSSP 132. The second IAM message 224 preferably has the rCLID as the calling number. The first and second IAMs are interrelated to an extent that the Circuit Identification Codes (CICs) in the two IAMs represent opposite ends of the same trunk facility. This interrelation of the two IAM messages requires that the EAN 164 be programmed to present itself to the network as a virtual switching point or an ISTP, as explained in Applicant's co-pending United States patent application no. 08/939,909, entitled METHOD AND APPARATUS FOR DYNAMICALLY ROUTING CALLS IN AN INTELLIGENT NETWORK which was filed on September 29, 1997.

As described above, the dSSP 132 queries the access database 166 on detecting the call completion request to the selected destination point. The user 100 and the selected destination point are alerted in steps 238 and 240.

This method of setting up the call from a control point in the switched telephone network provides a higher level of security in that the user 100 is not provided with the DN of the selected destination point.

As will be understood by those skilled in the art, the use of the rCLID is not strictly required but is preferable because it prevents unauthorized calls by parties who obtain knowledge of the DN of the destination point.

To establish a data connection through the telephone network using transceivers, this method of enforcing authorized access to the selected destination point in which, the call is setup from a control point in the switched telephone network, requires that the transceiver 104 at the selected destination point "originate on answer". On establishing a data connection between two prior art transceivers, the calling transceiver initiates a handshake sequence to establish a data link between the two transceivers. In accordance with the method described above, both transceivers are called - therefore one of the transceivers has to initiate the handshake sequence. In accordance with the invention, the transceiver at the selected destination point is enabled to "originate on answer". By enabling transceivers at the selected destination points to "originate on answer", an additional level of security is provided because their outdialling capability is disabled.

As will be apparent to persons skilled in the art, the authorized call setup method described above with reference to the switched telephone network configuration shown in FIG. 1 can also be employed using the switched telephone network configuration shown in FIG. 3.

Figure 5:
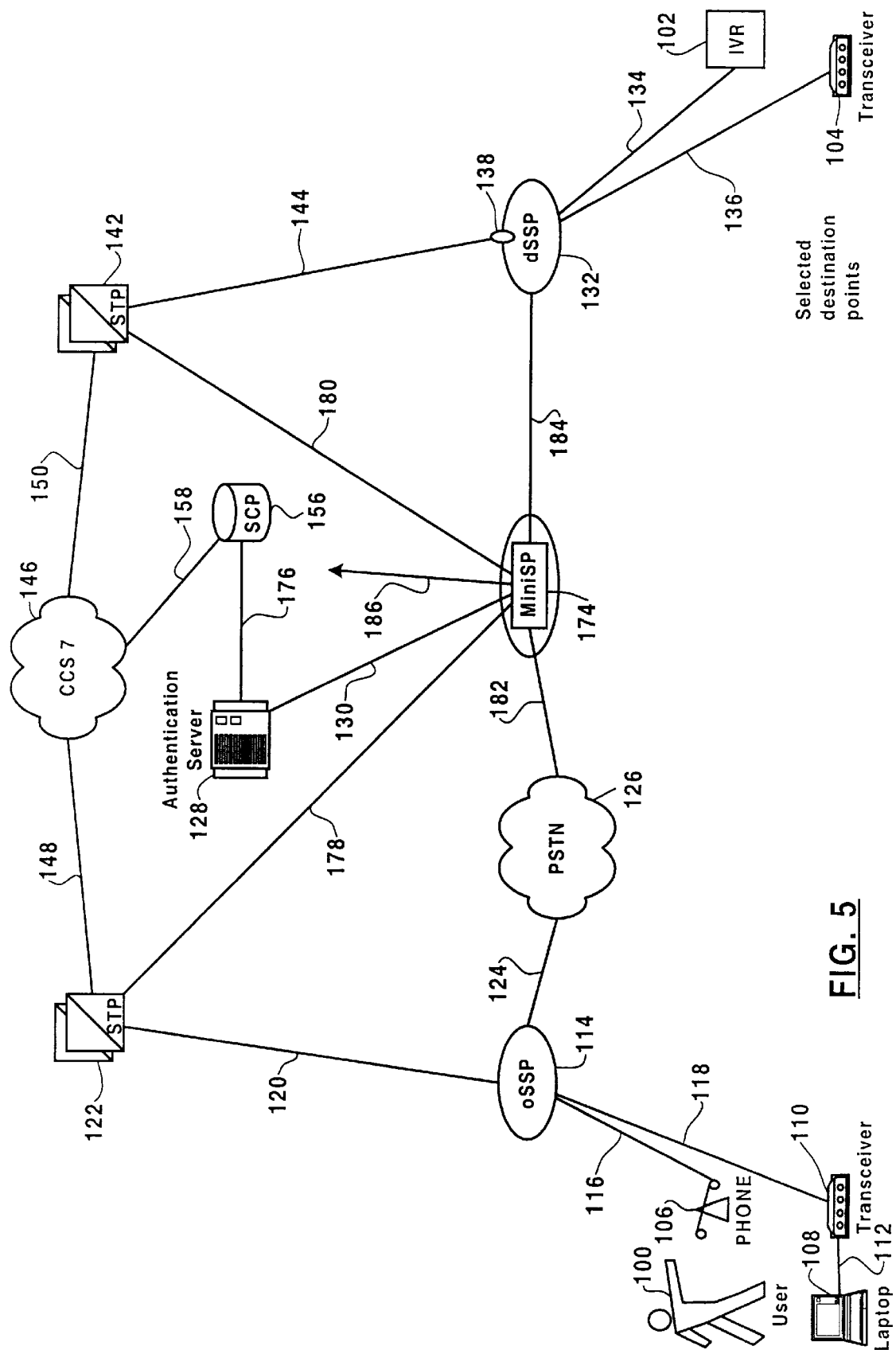
FIG. 5 is a schematic diagram showing yet another configuration of interconnected network elements in a switched telephone network enabled to provide authorized access to selected destination points.

FIG. 5 is a schematic diagram showing another configuration of a switched telephone network in accordance with another embodiment of the invention in which network elements provide authorized access to selected destination points. In this configuration, the EAN 152/164 is replaced by a mini- switching point (miniSP) 174 adapted to establish authorized telephone connections to selected destination points in the switched telephone network. The access database is preferably resident on an SCP 156. The miniSP 174 has a call routing table that is changed by the authentication server 128 upon authorizing the user 100 to complete a call to the selected destination point. In accordance with the invention, an rCLID is generated by the authentication server 128 subsequent to authenticating the user 100. The rCLID and the DN of the selected destination point are communicated to the miniSP 174 over link 130 and to the SCP 156 over link 176, to establish and enforce authorized access to the selected destination point. The link 176 may be a dedicated link or a data network connection.

In this implementation, since both the signaling path and voice payload path are routed through the miniSP 174, via signaling links 178 and 180 and voice trunks 182 and 184, the miniSP 174 is adapted to extract signaling information and payload information and provide a full audit 186 of the communications session.

Figure 6:
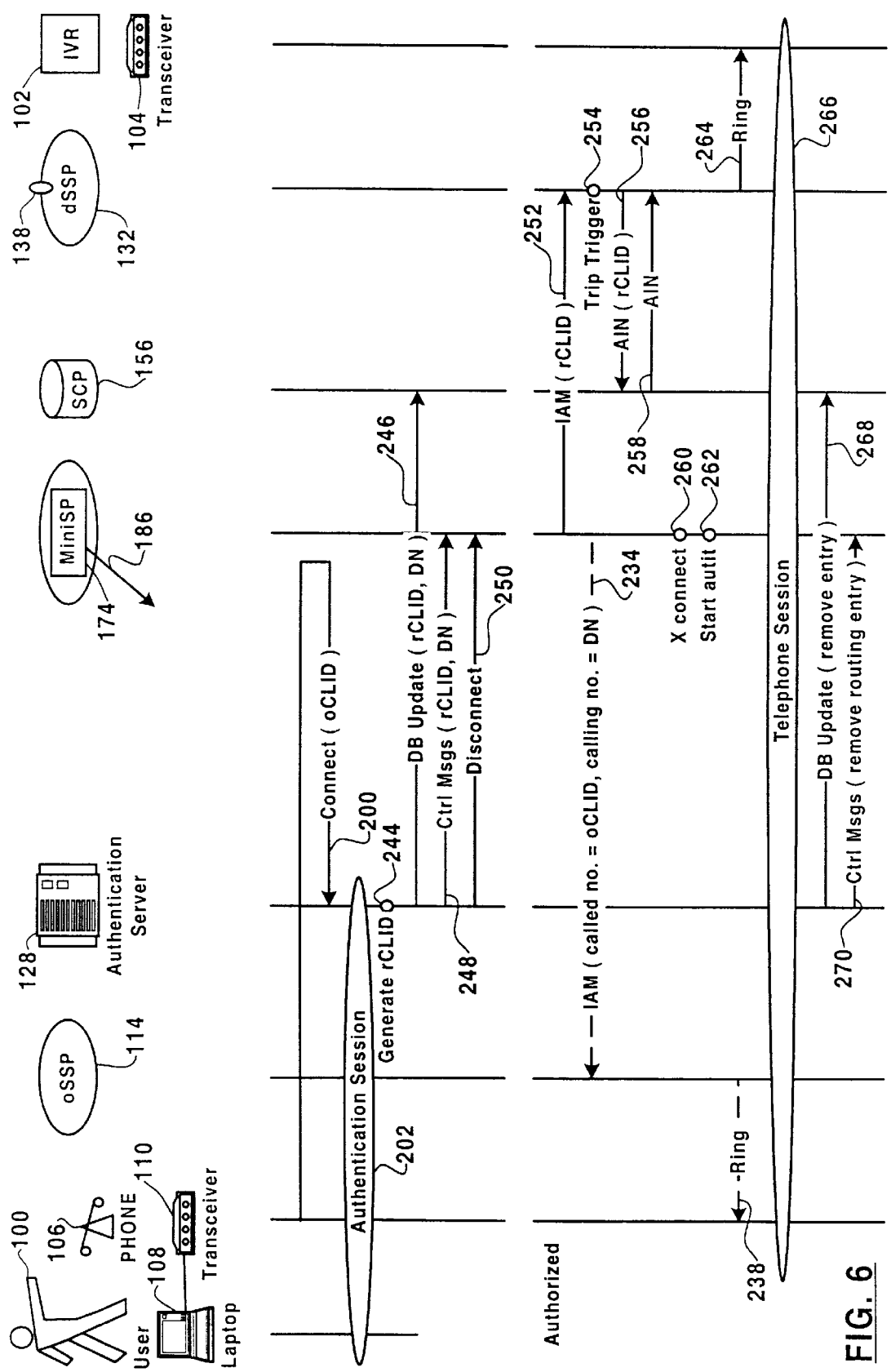
FIG. 6 is a call flow diagram in which one authorized telephone connection is completed from a control node of the switched telephone network for an authenticated user authorized to access a selected destination point.

FIG. 6 is a call flow diagram schematically illustrating an authorized call setup using the telephone network configuration shown in FIG. 5. The user 100 establishes a first telephone connection to the authentication server 128 via miniSP 174 employing ISUP signaling according to methods as known in the art summarized in step 200. On authenticating and authorizing the user 100 the authentication server 128 generates an rCLID in step 244 and updates the access database by providing the rCLID and DN of the selected destination point to the SCP 152 in step 246. The authentication server 128 also provides the miniSP 174 with routing information in step 248 to effect the changes in the routing tables of the miniSP 174 enabling re-routing of the call to the selected destination point. The rCLID and DN of the selected destination point are also provided.

The communications link between the authentication server 128 and the miniSP 174 is disconnected, in step 250. With the communications link between the origination point and the miniSP 174 still active, the miniSP 174, acting as a control point in the switched telephone network, places a call completion request to the selected destination point in step 252 using an IAM message having the rCLID as the calling number. The inbound trigger 138 is tripped in step 254, the access database on SCP 156 is consulted through TCAP messages in step 256. A permission response is returned to the dSSP 132 in step 258. The communications link between miniSP 174 and user 100 is cross-connected to the communications link between miniSP 174 and the selected destination point in step 260 according to the methods known in the art. The miniSP 174 may start auditing the connection, in step 262. The selected destination point is alerted in step 264 and subsequently a communications link is established between the miniSP 174 and the selected destination point. A telephone session 266 ensues. On completion of call setup of the telephone session, the authentication server 128 enforces access restrictions to the selected destination point by removing the rCLID from the access database in step 268. The routing table entry at the miniSP 174 is cleared on completion of the telephone session in step 270.

As will be apparent to a person skilled in the art, using this method to establish a data link between the origination point and the selected destination point requires the two step process presented above. In establishing the first telephone connection between the transceiver 110 and the authentication server 128 a first data link is also established before the user is authenticated. In establishing this first data link the transceiver 110 initiates a handshake sequence and achieves synchronization with a transceiver at the authentication server 128. In disconnecting this first telephone connection between the authentication server 128 and the miniSP 174, the first data link is also lost wherein the transceiver 110 detects a loss of synchronization. Following the start of the telephone session 266 between the transceiver 110 and the transceiver 104, transceiver 110 initiates another handshake sequence in accordance with known procedures. Alternatively, the connection with the user can be dropped after authorization and a new call placed in each direction by the miniSP 174, the miniSP representing a control point in the switched telephone network, as described above with reference to FIG. 4. In this case, the transceiver at the destination point answers in origination mode, as also described above.

Figure 7:
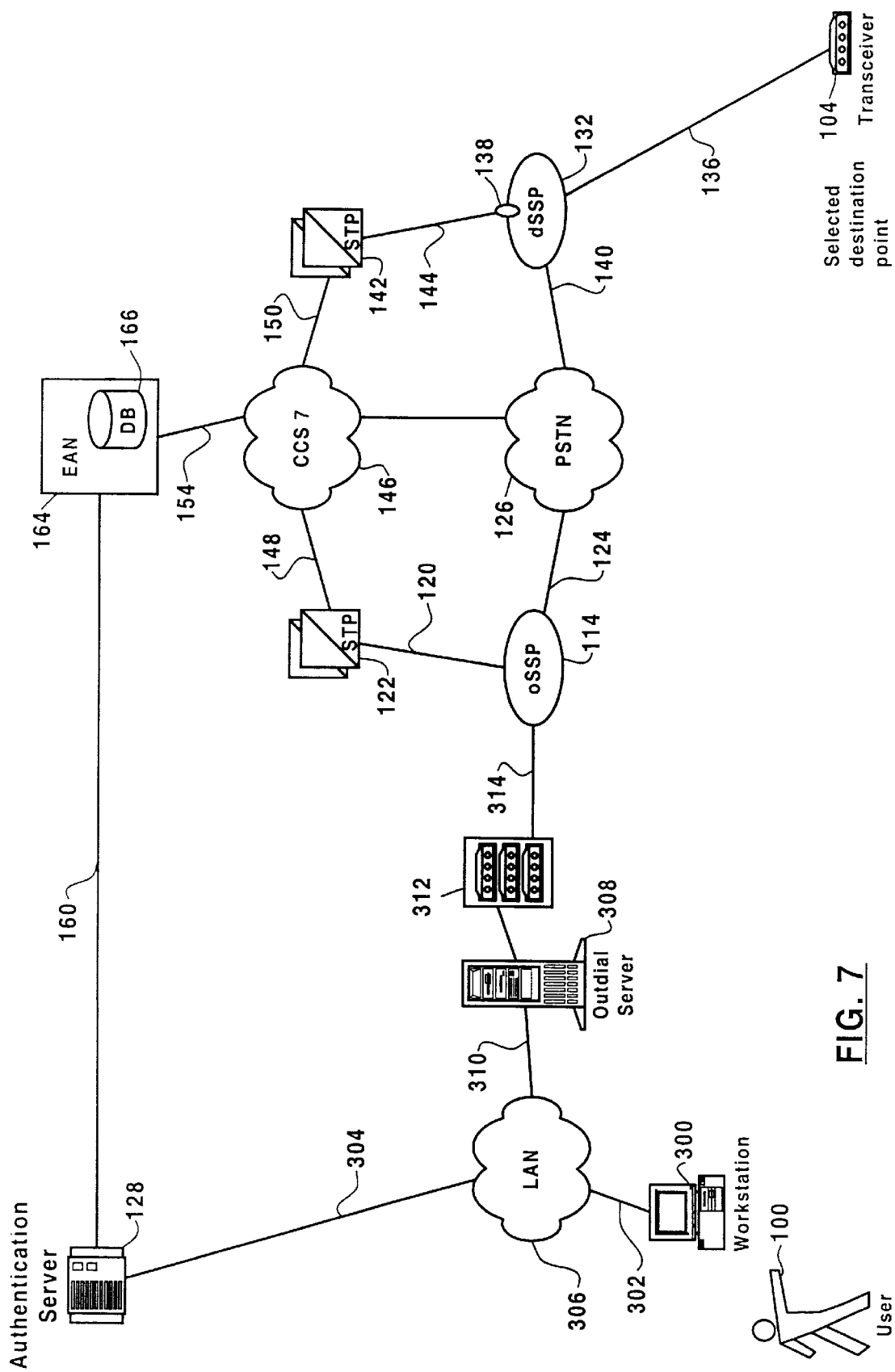
FIG. 7 is a schematic diagram showing network elements corresponding to a data network and a switched telephone network interconnected to enable authentication and call completion for an authorized user seeking access from the data network to a selected destination point in the switched telephone network.

FIG. 7 is a schematic diagram showing interconnected network elements in a data network and a switched telephone network adapted to enforce completion of authorized telephone connections, in accordance with another embodiment of the invention, to selected destination points in the switched telephone network using a pool of access transceivers associated with the data network.

Figure 7A:
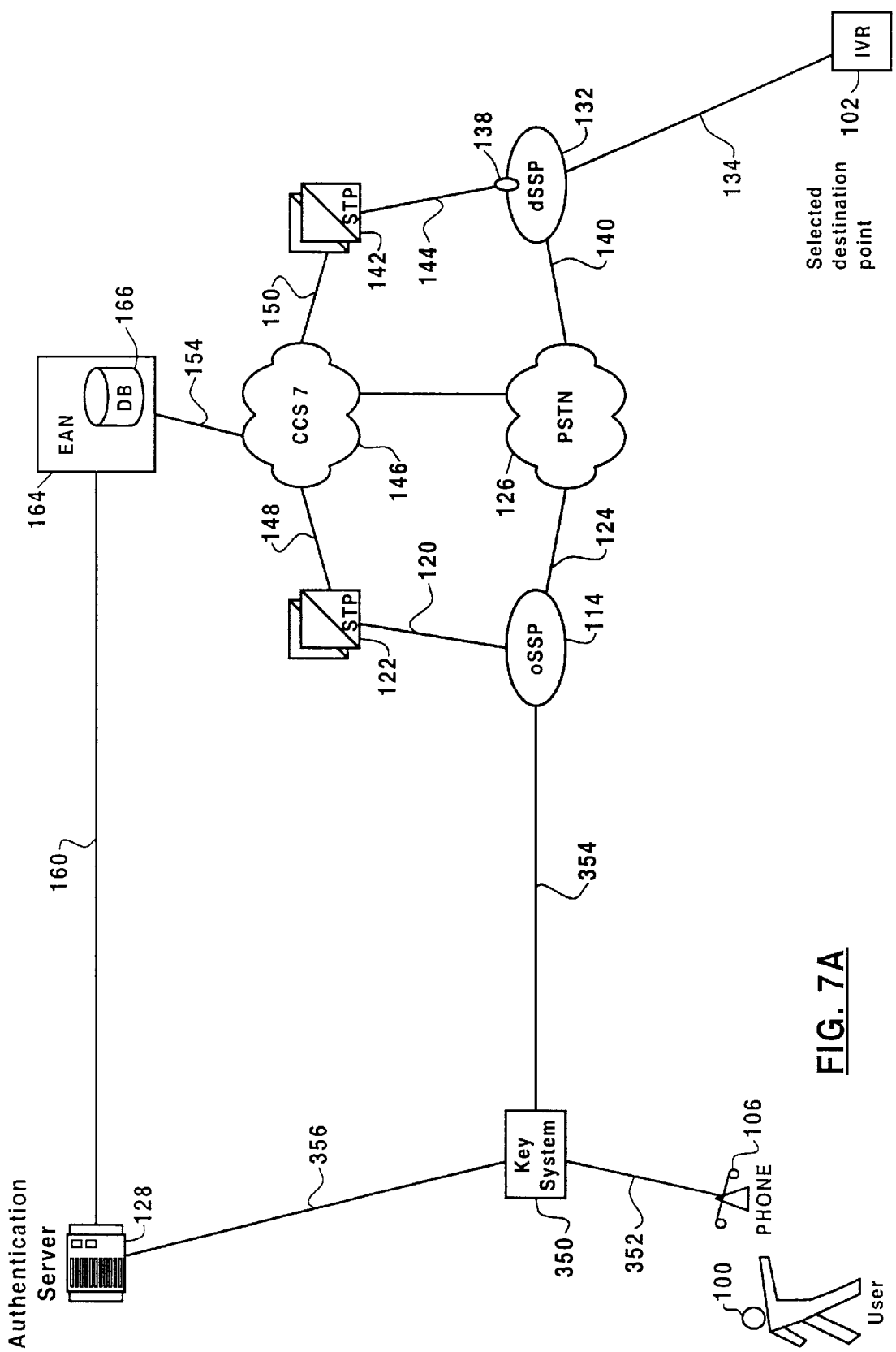
Figure 8:
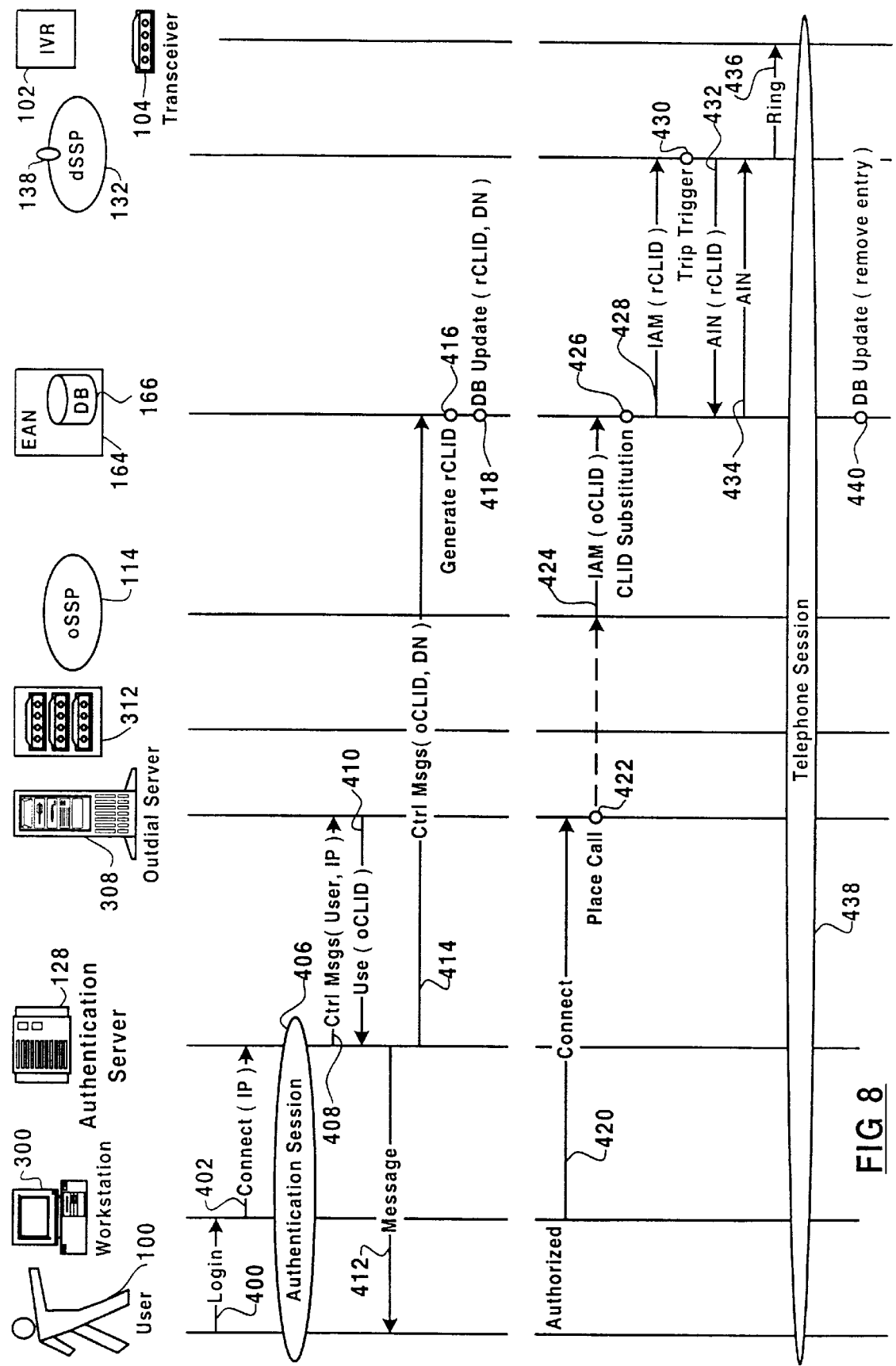
FIG. 8 is a call flow diagram in which an authenticated user in the data network shown in FIG. 7 is authorized to complete a telephone connection to a selected destination point in the switched telephone network via an assigned transceiver.

FIG. 8 schematically illustrates a call flow diagram corresponding to FIG. 7. In this embodiment the user 100 is no longer associated on a one-to-one basis with an oCLID due to the fact that a the transceivers in the transceiver pool and their associated local loops are shared on the data network. Consequently, the authentication information includes user's terminal identification on the data network and the oCLID of the transceiver used in establishing a telephone connection to the selected destination point in the switched telephone network. The embodiment is shown with respect to establishing data connections - a person skilled in the art will be able to appreciate that this embodiment can be extended to voice connections originating from behind a private telephone network such as a key system or Private Branch Exchange (PBX) as shown in FIG. 7a. In this case, the authentication server is also provided with an interface which enables it to act as a node connected behind the key system or PBX.

In the embodiment presented in FIG. 7, the authentication server 128 is addressable on the data network. In establishing a connection for authentication purposes, the user 100 need only establish a data network connection, in step 402, to the authentication server 128 using workstation 300. The workstation 300 provides the authentication server 128 with the user's 100 terminal identification in the process of setting up the data network connection. This first connection is established using data links 302 and 304 over Local Area Network (LAN) 306 representing the bulk of the data network. As part of the user authentication process 406, the user 100 provides an indication as to which selected destination point in the switched telephone network the user seeks access to. Upon authorizing the user 100 for access, the authentication server 128 requests, on behalf of user 100, from an outdialling server 308, to assign a transceiver from a transceiver pool 312 to be used in accessing the selected destination point. The request comprises a message sent over data links 304 and 310, in step 408. The outdialling server 308 provides the oCLID of the assigned transceiver in a message sent back to the authentication server 128 in step 410. The authentication server 128 sends a message, in step 412, to the user 100 instructing the user 100 to proceed by connecting to the outdialling server 308. The Dialing Number (DN) of the selected destination point may also be provided to the user 100.

In accordance with the invention, the authentication server 128 also sends messages to the EAN 164 with the oCLID and the DN, in step 414. These messages are sent over link 160 which may be a dedicated link or a data network link. As described above, the EAN 164 generates an rCLID in step 416 and updates the access database 166 in step 418. The user 100 establishes a data connection over data links 302 and 310 to the outdialling server 308, in step 420. A call is placed employing the assigned transceiver in step 422. A call completion request 424 is formulated using the oCLID and DN used to place the call. The call completion request 424 is routed to the EAN 164 as an IAM signaling message. The EAN 164 substitutes the rCLID for the oCLID in step 426 and forwards the IAM signaling message, in a step 428, to the dSSP 132 associated with the selected destination point. The trigger 138 is tripped on detecting the call completion request in step 430. The access database 166 is consulted in step 432, as described above using TCAP messaging. The selected destination point is alerted in step 436 on receiving a permission response from the EAN 164 in step 434. A telephone session 438 ensues. The rCLID is removed from the access database 166, in step 440 after call setup preventing further calls to complete to the selected destination point.

A person skilled in the art will appreciate that, according to another method (not shown), the authentication server 128 and the EAN 164 can co-operatively establish, after authorization, an end-to-end data link, for the user 100, from the user's terminal 300 within the data network 306 to the selected destination point in the switched telephone network without departing from the spirit of the invention.

As described above, for data connections set up from a control point in the switched telephone network, "originate on answer" transceivers are employed at the selected destination points. According to this method, the user will not be involved in the setup of the second telephone connection over the switched telephone network to the selected destination point.

Figure 9:
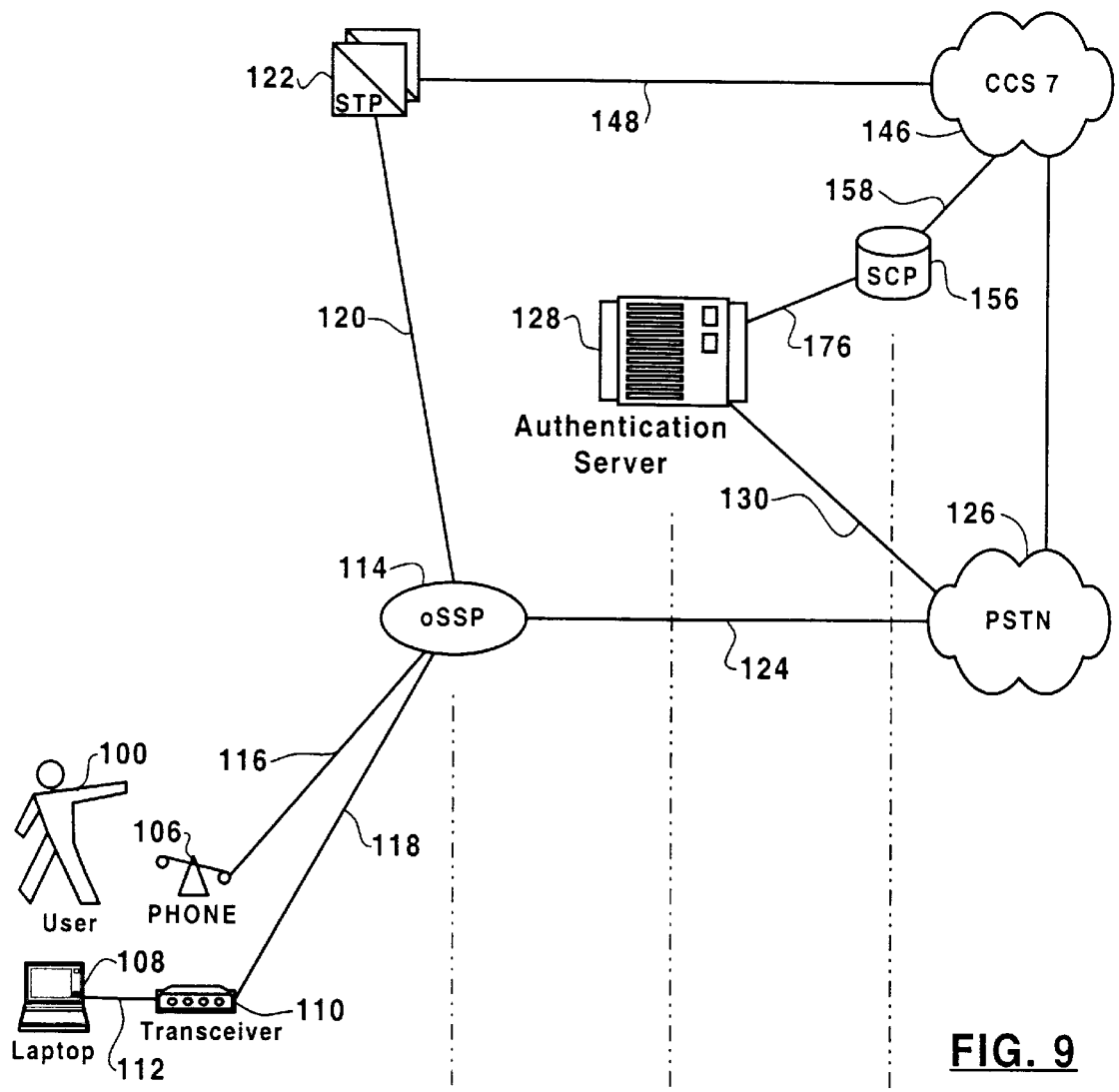
FIG. 9 is a schematic diagram showing a detail of a switched telephone network enabled to authenticate users.

FIG. 9 shows a schematic diagram of a detail of a switched telephone network adapted to authenticate a user. Authentication services are provided for a user 100 either equipped with a telephone set 106 or a terminal 108 connected via a link 112 to a transceiver 110. To provide user authentication, an authentication server 128 is accessible on the switched telephone network via a link 130. An SCP 156 maintaining an access database is accessible via a signaling link 158 and the SCP 156 is updated by the authentication server 128 with access authorization information using a link 176. The link 176 may be a dedicated link or a data network link.

Figure 10:
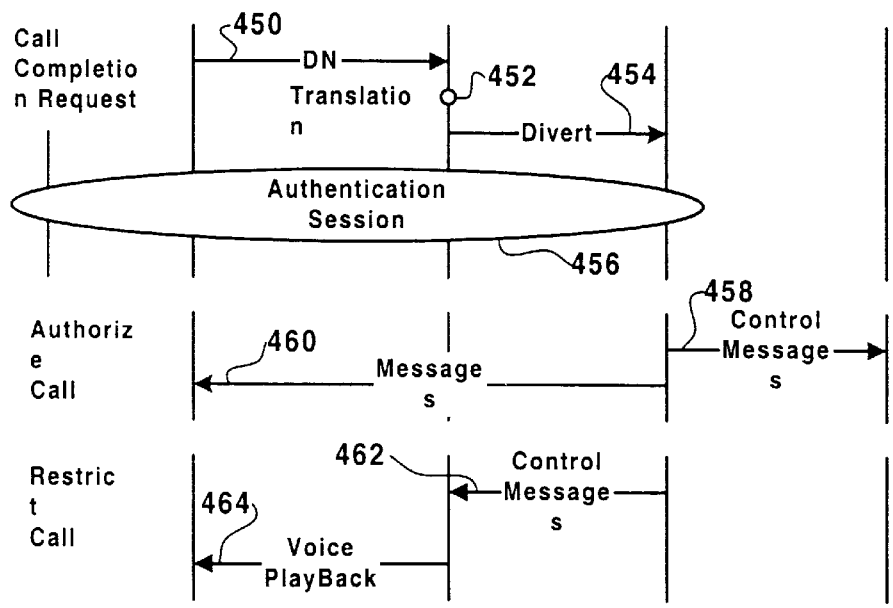
FIG. 10 is a call flow diagram in which a user is authenticated in a switched telephone network and authorization of call completion is enforced using the network configuration shown in FIG. 9.

FIG. 10 shows a call flow diagram in which a user seeking access over the switched telephone network to a selected destination point is authenticated. The user 100 dials a DN associated with requesting access to a selected destination point in step 450. During translation at the oSSP 114 the DN is recognized as requiring special treatment, in step 452. The call completion request is diverted, by appropriately routing the call according to methods known in the art, and the call is completed to the authentication server 128 in step 454. A first telephone connection is established between the authentication server 128 and the user 100. The user 100 is authenticated in an authentication session 456.

On positive authentication and subsequent to authorization checks, the user 100 is authorized to place a call to a selected destination point in the switched telephone network. The authentication server 128 sends control messages in step 458 to the SCP 156 and sends messages to the user 100 in step 460 informing the user 100 of positive authentication, access authorization and perhaps providing other details as will be described below.

On failing authentication or access authorization, the authentication server 128 instructs the oSSP 114, in step 462, to playback a message to the user 100 in step 464 informing the user 100 of access authorization restrictions in effect.

In some applications, the user 100 may call the authentication server 128 directly and on authorization the user 100 my receive a DN corresponding to the selected destination point. Alternatively the oSSP 114 can monitor the users local loop 116/118 employing an outbound trigger, according to methods known in the art, and establish the first telephone connection to the authentication server 128 automatically on behalf of the user 100 on detecting an off-hook condition on the local loop 116/118.

Figure 11:
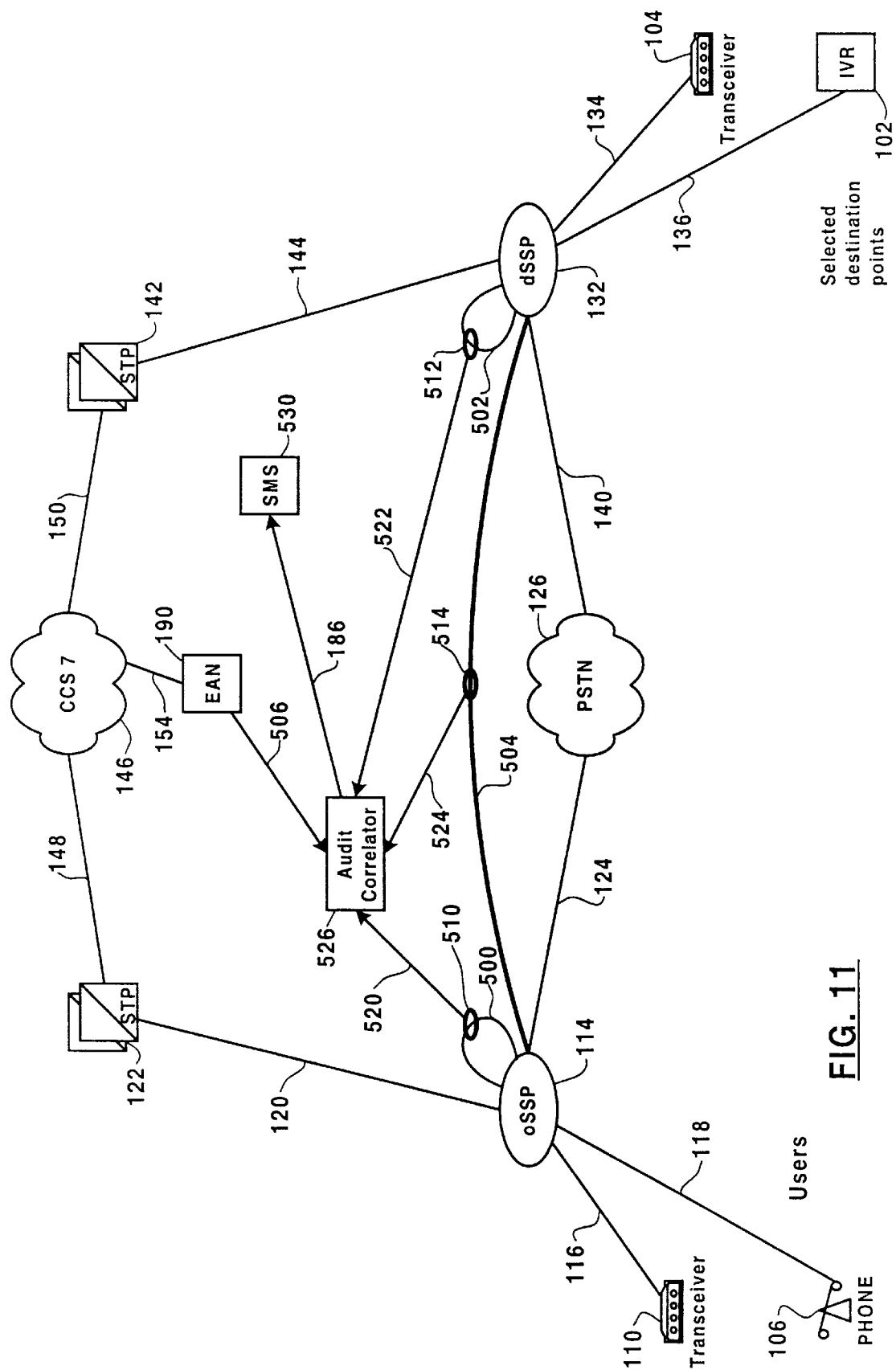
FIG. 11 is a schematic diagram showing switched telephone network elements providing signal and payload audited telephone connections.

FIG. 11 is a connection diagram showing another detail in which switched telephone network elements provide signal and payload audited telephone sessions to selected destination points in the switched telephone network in accordance with Applicant's United States Patent Application Serial Number 2209238 which is incorporated herein by reference. Only minimal details are provided herein as they relate to the present invention; full details of the auditing process are included in the above mentioned application.

Auditing is provided in the switched telephone network for telephone connections initiated at origination points represented, for example, by telephone set 106 or transceiver 110. The oSSP 114 is equipped with loop-back trunks 500 used in extracting payload information. A dSSP 132 services selected destination points represented, for example, by transceiver 104 and IVR 102. Associated with the dSSP 132 there are loop-back trunks 502 used in extracting payload information. Associated with the oSSP 114 and the dSSP 132 there is an EAN 190 acting as a virtual switching point in the switched telephone network enabled to route telephone connections through either of loop-back trunks 500 or 502, or Extended Integrated Services Digital Network User Part (EISUP) trunks 504 connected between the oSSP 114 and the dSSP 132. As described in the above mentioned application, the voice payload is routed through loop-back trunks 500, 502 and EISUP trunk 504 by routing signaling messages via signaling links 120/148/154 or 144/150/154, respectively. The EAN 190 besides routing telephone connections through voice trunks adapted for the extraction of payload information such as 500, 502 and 504, is enabled to extract signaling information 506. The payload information is extracted from voice trunks 500, 502 and 504 via bridged intercepts 510, 512 and 514, respectively. The extracted payload information 520, 522 and 524 is provided to an audit correlator 526. The audit correlator 526 correlates the signaling information 506 with the associated payload information and provides a full audit 186 to a Service Management System (SMS) 530.

FIG. 12 is a call flow diagram showing the steps of setting up a telephone connection initiated via an oSSP equipped with loop-back trunks and providing a full audit of a telephone session between an origination point and a selected destination point in the switched telephone network.

A directory number (DN) is dialed in step 600. The DN is recognized in translation in step 602 as requiring special treatment and the oSSP 114 routes the call through the loop-back trunk 500 by sending an IAM message in step 604 to the EAN 190, according to methods described in the above mentioned Application. Auditing is activated in step 606. The EAN 190 sends back the IAM message in step 608 to the oSSP 114 instructing the oSSP 114 to continue normal call processing in step 610. A telephone session 612 ensues. The signaling information 506 is provided from the EAN 190 to the audit correlator 526 in step 614. The payload information 520 from the bridged intercept 510 is provided to the audit correlator 526 in step 616. The audit correlator 526 correlates the received information in step 618 and provides a full audit 186 in step 620 to the SMS 530.

FIG. 13 shows a call flow diagram showing the steps of setting up a telephone connection via a dSSP equipped with loop-back trunks providing a full audit of the telephone session between an origination point and a selected destination point in the switched telephone network.

On dialing a directory number (DN) in step 600 an IAM is sent in step 622 from the oSSP 114 to the dSSP 132. On translating the DN in step 624 the dSSP 132 recognizes that the call completion request requires special treatment and routes the voice path of the call through the loop-back trunk 502 by sending the IAM message, in step 626, to the EAN 190 according to methods presented in the above-mentioned Application. Auditing is activated in step 628 and the IAM message is sent back to the dSSP 132 in step 630 instructing the dSSP 132 to continue normal call processing. A telephone session 632 ensues between the origination point and the selected destination point. Signaling information 506 is provided from the EAN 190 in step 634 and the payload information 522 is provided by the bridged intercept 512 on the loop-back trunk 502 in step 636. The signaling information 506 and the payload information 522 are correlated by the audit correlator 520 in step 638. A full audit 186 is provided to the SMS 530 in step 640.

According to another method, payload information and signaling information associated with a monitored telephone session can be provided to the SMS 530 in real time. Intrusions and misuse can be detected and acted upon in real time. With minimal provision of a communications link to between the SMS 530 in the EAN 190, established telephone sessions can be terminated by instructing the EAN 190 to send release signaling messages to the oSSP 114 and the dSSP 132. According to this method monitored telephone sessions can be released from a control point in the switched telephone network.

We claim:

1. A method of enforcing network-centric control over access to a selected destination point in a network adapted to complete calls through a switched telephone network to the selected destination point in response to a call completion request from an origination point in the network, comprising the steps of:
   a) establishing a first connection between a user at the origination point and an authentication server in the network;
   b) authenticating the user in an authentication session over the established first connection;
   c) selectively authorizing the user for access to the selected destination point;
   d) substituting an origination calling line identification CLID with an authorized CLID in a call completion request associated with a second connection, and enabling a destination SSP to selectively complete a second connection to the selected destination point only if the authorized CLID is included in the call completion request; and
   e) preventing network elements from completing a subsequent connection to the selected destination point unless a user is authenticated and authorized anew.

2. A method as claimed in claim 1, wherein completing the second connection further comprises the steps of:
   a) routing the call completion request in the network to a control point enforcing network-centric control over access to the selected destination point;
   b) selectively modifying the call completion request by substituting the origination CLID with the authorized CLID; and
   c) routing the modified call completion request to the destination SSP.

3. A method as claimed in claim 1, wherein establishing the first connection a directory number (DN) associated with the selected destination point is dialed, the method further comprising the steps of:
   a) detecting the dialed DN; and
   b) diverting the call to a point in the network adapted to authenticate the user.

4. A method as claimed in claim 3, wherein the step of detecting the dialed DN is performed by an origination SSP associated with the origination point.

5. A method as claimed in claim 3, wherein the step of detecting the DN is performed by the destination SSP.

6. A method as claimed in claim 1, wherein establishing the first connection, a DN associated with a point in the network adapted to authenticate the user is dialed.

7. A method as claimed in claim 1, wherein establishing the first connection, a general DN for authentication is dialed and the step of establishing the first connection, further comprises the steps of:
   a) detecting the dialed general DN; and
   b) diverting the call to the point in the network adapted to authenticate the user.

8. A method as claimed in claim 1, wherein the step of authenticating the user associated with the origination point in an authentication session further comprises the steps of:
   a) receiving an origination CLID associated with the origination point;
   b) receiving an indication that the user requests access to the selected destination point;
   c) receiving authentication information from the user; and
   d) validating the received authentication information.

9. A method as claimed in claim 1, wherein the step of enabling network elements to complete the second connection further comprises the step of:
   a) providing a control point in the network, the control point being adapted to enforce network-centric control over access to the selected destination point, with the origination CLID and the indication that the user requests access to the selected destination point.

10. A method as claimed in claim 1, wherein the step of enabling network elements to complete the second connection further comprises the step of:
    a) issuing an authorized CLID.

11. A method as claimed in claim 10, wherein the step of issuing the authorized CLID is performed by a control point in the network enforcing network-centric control over access to the selected destination point.

12. A method as claimed in claim 10, wherein the step of issuing the authorized CLID is performed by a point in the network adapted to authenticate the user.

13. A method as claimed in claim 10, wherein the step of issuing the authorized CLID comprises the generation of a pseudo random CLID.

14. A method as claimed in claim 1, wherein the step of enabling the destination SSP to selectively complete the second connection to the selected destination point further comprises the step of:
    a) adding the authorized CLID to an authorized CLID list associated with the selected destination point, the authorized CLID list being maintained in an access database available in the network.

15. A method as claimed in claim 14, wherein the step of adding the authorized CLID to the authorized CLID list comprises the step of:
    a) sending messages to the access database.

16. A method as claimed in claim 15, wherein the step of sending messages to the access database is performed employing a secure link to the access database.

17. A method as claimed in claim 9, wherein establishing the second connection, further comprises the steps of:
    a) placing a call completion request from the control point to the origination point using the origination CLID as the called number; and
    b) placing a call completion request from the control point to the selected destination point using the authorized CLID as the calling number.

18. A method as claimed in claim 17, wherein the method further comprises the step of:
    a) exchanging signaling messages between the origination point and the selected destination point and, selectively substituting the origination CLID with the authorized CLID.

19. A method as claimed in claim 9, wherein establishing the second connection further comprises the steps of:
   a) routing the payload path through equipment adapted to extract payload information;
   b) extracting information from signaling messages related to the second connection; and
   c) providing a full audit of the telephone session associated with the second connection.

20. A method as claimed in claim 19, wherein the step of providing the full audit of the second connection enables enforcement of access restrictions.

21. A method as claimed in claim 20, wherein in enforcing access restrictions the method further comprises the steps of:
   a) detecting unauthorized activity associated with the second connection; and
   b) releasing the second connection.

22. A method as claimed in claim 21, wherein the step of releasing the second connection further comprises the steps of:
   a) sending a call release message from the control point to the selected destination point; and
   b) sending a call release message from the control point to the origination point.

23. A method as claimed in claim 1, wherein the first connection is established over a data network and the authentication server is accessible in the data network.

24. A method as claimed in claim 23, wherein authorizing the user for access to the selected destination point further comprises:
   a) Selecting a transceiver from a pool of transceivers available in the data network; and
   b) Associating the transceiver with the second connection.

25. A telephone network adapted to enforce network-centric control over access to a selected destination point in a switched telephone network, the switched telephone network being adapted to complete calls to the selected destination point on receiving a call completion request having an authorized calling line identification CLID associated with an origination point, the switched telephone network comprising:
   a) a control point in the switched telephone network adapted to generate an authorized CLID associated with the origination point, update an authorized CLID list associated with the selected destination point, and remove the authorized CLID from the authorized CLID list on completion of the call;
   b) an access database comprising the authorized CLID list associated with the selected destination point; and
   c) a destination SSP associated with the selected destination point adapted to selectively complete a second connection to the selected destination point based on the authorized CLID on receiving a call completion request.

26. A telephone network as claimed in claim 25, further comprising:
   a) an intelligent peripheral adapted to authenticate and authorize a user associated with the origination point for access to the selected destination point.

27. A telephone network as claimed in claim 26, wherein the intelligent peripheral adapted to authenticate a user is an authentication server further comprising:
   a) an interface adapted to establish a telephone connection with the origination point; and
   b) an interface adapted to convey control messages to network elements in the telephone network.

28. A telephone network as claimed in claim 27, wherein the authentication server is adapted to authenticate the user through positive identification of a unique voice print possessed by the user.

29. A telephone network as claimed in claim 27, wherein the authentication server is adapted to authenticate the user over an established first telephone voice connection between the authentication server and the origination point.

30. A telephone network as claimed in claim 27, wherein the authentication server is adapted to authenticate the user over an established first data connection.

31. A telephone network as claimed in claim 30, wherein the user is equipped with a multimedia terminal adapted to extract the voice print of the user and convey a digital equivalent of the voice print to the authentication server over the established first data connection.

32. A telephone network as claimed in claim 30, wherein the first data connection is established over the telephone network between the authentication server and the origination point.

33. A telephone network as claimed in claim 30, wherein the first data connection is established over an associated data network between the authentication server and an user terminal in the associated data network.

34. A telephone network as claimed in claim 27, wherein the user is equipped with a non-dialable directory number (DN) for requesting access to the selected destination point and the network is adapted to redirect an access request to the authentication server authenticating the user.

35. A telephone network as claimed in claim 25, wherein the control point further comprises:
   a) an interface for receiving messages from the authentication server.

36. A telephone network as claimed in claim 35 wherein the interface is a dedicated interface for exchanging messages with the authentication server over a link.

37. A telephone network as claimed in claim 25, wherein the control point further comprises:
   a) the authorized CLID list in an access database.

38. A telephone network as claimed in claim 35, wherein the control point further comprises:
   a) an interface for conveying messages to a network element comprising an access database adapted to maintain the authorized CLID list associated with the selected destination point.

39. A telephone network as claimed in claim 38, wherein the interface is a dedicated interface for exchanging messages with the access database over a link.

40. A telephone network as claimed in claim 25, wherein the control point comprises:
   a) a virtual switching point in the signaling plane of the telephone network.

41. A telephone network as claimed in claim 40, wherein the payload layer associated with the virtual switching point comprises:
   a) Extended Integrated Services Digital Network User Part (EISUP) trunks between two SSPs associated with the virtual switching point.

42. A telephone network as claimed in claim 41, wherein the EISUP trunks are adapted to extract payload information.

43. A telephone network as claimed in claim 40, wherein the payload layer associated with the virtual switching point comprises:
   a) loop-back trunks at an SSP associated with the virtual switching point.

44. A telephone network as claimed in claim 43, wherein the loop-back trunks are adapted to extract payload information.

45. A telephone network as claimed in claim 43, wherein the SSP is the destination SSP associated with the selected destination point.

46. A telephone network as claimed in claim 43, wherein the SSP is an origination service switching point associated with the origination point.

47. A telephone network as claimed in claim 40, wherein the virtual switching point is further adapted to extract signaling information associated with a call completion request to the selected destination point.

48. A telephone network as claimed in claim 25, wherein the control point comprises a dedicated switching point through which call completion requests to the selected destination point are routed at the signaling level and the payload level.

49. A telephone network as claimed in claim 48, wherein the dedicated switching point is further adapted to extract and correlate signaling information and payload information into a full audit corresponding to an established communication session to the selected destination point.

50. A telephone network as claimed in claim 48, wherein the dedicated switching point further comprises an interface for receiving messages containing an authorized CLID and a DN associated with the selected destination point from the authentication server over a link.

51. A telephone network as claimed in claim 50, wherein the interface is a dedicated interface adapted to exchange messages with the authentication server over a link.

52. A telephone network as claimed in claim 25, wherein the destination SSP is adapted to detect a call completion request to the selected destination point and to complete the call only on received instructions from querying the access database based on the CLID extracted from a received call completion request.

53. A telephone network as claimed in claim 25, wherein access control over data connections over the telephone network established from the control point is further enabled by the selected destination point comprising:
   a) a transceiver adapted to initiate a handshake sequence to establish the data connection on answering.

54. A telephone network as claimed in claim 25, further comprising:
   a) a component providing full audit of a telephone connection to the selected destination point, the component being enabled to receive and correlate, signaling information and payload information.

55. A telephone network as claimed in claim 54, further comprising:
   a) a support management system enabled to receive a full audit of a telephone connection.

56. A telephone network as claimed in claim 55, wherein the support management system is further enabled to:
   a) detect anomalous activity from the full audit;
   b) connect to network elements; and
   c) manipulate the established call between an origination point and a selected destination point.

* * * * *